(12) United States Patent
Cruze

(10) Patent No.: US 6,263,052 B1
(45) Date of Patent: Jul. 17, 2001

(54) AUTOINTERACTION COMMUNICATION SYSTEM

(75) Inventor: Guille B. Cruze, Knoxville, TN (US)

(73) Assignee: The White Stone Group, L.L.C., Knoxville, TN (US)

( * ) Notice: Subject to any disclaimer, the term of this patent is extended or adjusted under 35 U.S.C. 154(b) by 0 days.

(21) Appl. No.: 09/034,788

(22) Filed: Mar. 4, 1998

(51) Int. Cl.[7] .................................................. H04M 11/00
(52) U.S. Cl. .................................... 379/88.18; 379/88.16; 379/88.22; 379/38
(58) Field of Search ............................... 379/37, 38, 67.1, 379/69, 76, 88.01, 88.04, 88.18, 88.22, 88.23, 88.25, 88.28, 201, 209

(56) References Cited

U.S. PATENT DOCUMENTS

| | | | |
|---|---|---|---|
| 5,633,910 | * | 5/1997 | Cohen ..................................... 379/38 |
| 5,745,692 | * | 4/1998 | Lohmann, II et al. ............... 709/223 |
| 5,822,405 | * | 10/1998 | Astarabadi ......................... 379/88.04 |
| 5,926,526 | * | 7/1999 | Rapaport et al. .................. 379/88.25 |
| 5,953,393 | * | 9/1999 | Culbreth et al. ................... 379/88.25 |
| 5,970,122 | * | 10/1999 | LaPorta et al. ...................... 379/67.1 |
| 5,982,863 | * | 11/1999 | Smiley et al. ........................ 379/112 |

* cited by examiner

Primary Examiner—Scott L. Weaver
Assistant Examiner—Roland G. Foster
(74) Attorney, Agent, or Firm—Luedeka, Neely & Graham, P.C.

(57) ABSTRACT

A communication system for providing communication between a first party and second party. A first party message input receives first party messages from the first party, and a first party message output delivers the first party messages to the second party in an unattended manner. A second party message input receives second party messages from the second party in response to the first party messages, and a second party message output delivers the second party messages to the first party in an unattended manner. A pass-through message channel receives and delivers in an attended manner pass-through messages between the second party and the first party. A memory records, stores, and indexes the first party messages, the second party messages, and the pass-through messages.

3 Claims, 13 Drawing Sheets

AUTOINTERACTION COMMUNICATION SYSTEM

FIELD

This invention relates to electronic communication. More particularly the invention relates to delivery of and response to electronic messages, where the communicating parties may deliver and respond to the messages without the immediate attendance of the other parties.

BACKGROUND

Electronic communication has further enabled people to communicate one with another without the need for both parties to be immediately present. For example, email enables a party to deliver a message, without the need for the other party to actively monitor his email account. A sent message is received electronically, and resides within the computer system until the receiving party is ready to view the message. Similarly, a party may deliver a voice mail message to a telephone answering machine, without the need for the other party to monitor the telephone call. The voice mail message resides on the answering machine until the receiving party is ready to listen to the message.

While communication of this type has allowed people greater freedom in deciding when they will either deliver or respond to a message, such communication is only applicable to communication in a single direction; that is to say, messages which are created by a delivering party are sent to and received by a receiving party. In other words, the communication tends to be unilateral There is no provision for bilateral communication in which the receiving party responds to the message received, and the response is delivered to the original delivering party in an automated fashion.

For example, a first party needs information from a second party, such as a health service provider seeking a verification of benefits from an insurance company. Before the insurance company can verify benefits, it needs certain information from the service provider, such as the name of the patient and the type of service to be rendered. The service provider could leave a voice mail for the insurance company, in which the needed information is given. However, this would require that the insurance company take the time and bear the expense to place a return telephone call to the service provider and leave the verification with either a live party or in a separate voice mail. Unfortunately, many parties, such as insurance companies, prefer to not operate in such a manner.

Typically, an employee of the service provider, such as a nurse, must wait on hold in a telephone queue until the insurance company is ready to answer the telephone call, at which time the service provider can deliver the needed information and receive the desired verification in response. The actual communication may be very brief in comparison to the length of time spent on hold, and the time spent on hold may represent lost productivity and additional expense to the service provider.

What is needed, therefore, is a communication system in which an automated interaction between parties is possible, such that the parties can deliver and respond to messages without independently contacting one another in a unilateral and disassociated manner.

SUMMARY

A source code microfiche appendix having two total slides and 160 total frames is appended hereto. The code listed in the microfiche appendix details actual implementation of some of the methods and apparatuses described herein, and is included herein by reference.

The above and other needs are met by an apparatus for providing communication between a first station and a second station. The first and second stations each have signal output means for transmitting signals and signal input means for receiving signals. The signal output means of each of the first and second stations operate to selectively transmit different types of information within the transmitted signals, including messages and prompt signals. The signal input means of each of the first and second stations operate to selectively receive different types of information within the transmitted and received signals.

First station communication means establish electronic communication between the signal output means of the first station and the first input means. The first input means activate in response to a prompt signal from the signal output means of the first station, and receive signals from the signal output means of the first station across the first station communication means. The signals include a first message containing at least a subset of the different types of information. First logic means activate in response to a prompt signal from the signal output means of the first station across the first station communication means to terminate the communication established between the first station and first input means.

Second station communications establish electronic communication between the second station and a first output means. The electronic communication includes transmission of signals between the signal input means of the second station and the first output means. The first output means activate in response to a prompt signal from the signal output of the second station, and transmit signals to the signal input means of the second station across the second station communication means, independently of communication between the first input means and the signal output means of the first station across the first station communication means.

Second logic means repeatedly communicate selection criteria signals from the first output means to the signal input means of the second station across the second station communication means, to enable the second station to selectively receive at least one of the different types of information from the subset of information in the first message, and provide, via the second station signal output means, response signals containing a second message related to the selected type of information. Third logic means receive a prompt signal from the signal output means of the second station across the second station communication means. In response to the prompt signal, the third logic means transmit the subset of the first message to the signal input means of the second station from the first output means across the second communication means.

Fourth logic means receive a prompt signal from the signal output means of the second station across the second station communication means, and terminate the communication established between the second station and the second input means in response to the third prompt signal. Second output means transmit the second message to the signal input means of the first station across the first station communication means. Memory means record, store, and index the first and second messages.

Therefore, the autointeraction communication system described provides for the unattended relay of messages between two parties, in which the second party can receive and respond to messages from the first party. The first party does not need to waste time waiting for the availability of the second party, and the second party does not need to waste time waiting for the availability of the first party. Further, the communication system handles all of the details of contacting the two parties, so that the parties may be freed from the mechanics of the communication, and focus instead on the messages being sent and received.

In preferred embodiments of the invention a weave file means navigates second station input means menus and first station input means menus. Thus, the communication system is able to contact the proper person within each of the two parties, or provide other information required by the respective telephone menu structures in order to make the appropriate contact. First message playback means selectively present the first message to the first station and second message playback means selectively present the second message to the second station. Further, second station recontact means selectively repeatedly attempt to transmit the first message to the second station until the first message is successfully transmitted, and first station recontact means selectively repeatedly attempt to transmit the second message to the first station until the second message is successfully transmitted.

In a method for providing communication between a first station and a second station, the first and second station each have signal output and signal input means for respectively transmitting and receiving signals. The signal output means of each of the first and second stations operate to selectively transmit different types of information within the transmitted signals, including prompt signals. The signal input means of each of the first and second stations operate to selectively transmit and receive different types of information within the transmitted and received signals.

Communication is established with the first station with first station communication means. The transmitted signals from the output means of the first station are received across the first station communication means with first input means. The transmitted signals contain a first message having at least a subset of the different types of first station information. A first prompt signal is received from the first station across the first station communications means, and the communication established on the first station communications means is terminated with logic means in response to the first prompt signal.

Communication with the second station is established with second station communication means, which are independent of the first station communication means. Signals are transmitted to the second station across the second station communication means with first output means. Selection criteria are repeatedly offered from the first output means to the second station input means across the second station communication means with the logic means, for the second station to selectively request subsets of the first message. Signals transmitted from the output means of the second station are received across the second station communication means with second input means.

A second prompt signal from the second station is received across the second station communication means. The subsets of the first message are selectively sent to the second station via the first output means across the second communication means in response to the second prompt signal with the logic means. The transmitted signals from the output means of the second station are received across the second communication means with the second input means. The transmitted signals contain a second message having at least a subset of the different types of second station information. The subset of the different types of second station information in the second message relate to the subset of the different types of first station information in the first message.

A third prompt signal is received from the second station and the communication established on the second station communication means is terminated with the logic means in response to the third prompt signal. Signals are transmitted to the first station across the first station communication means with second output means. The transmitted signals contain the second message. The first station messages and the second station messages are recorded, stored, and indexed with memory means.

In another embodiment, a communication system provides communication between a first party and second party. A first party message input receives first party messages from the first party, and a first party. message output delivers the first party messages to the second party in an unattended manner. Thus, the first party need not wait until the second party is available before the first party messages are delivered. A second party message input receives second party messages from the second party in response to the first party messages, and a second party message output delivers the second party messages to the first party in an unattended manner. Thus, the second party may make an automated and unattended response to the first party message. A passthrough message channel receives and delivers in an attended manner pass-through messages between the second party and the first party. Thus, the second party may contact the first party in an attended manner if the second party so desires. A memory records, stores, and indexes the first party messages, the second party messages, and the pass-through messages. In this manner, the first party may at any time retrieve and review all messages in the system.

In various preferred embodiments of the invention a weave file navigates the telephone menu structures associated with the first party and the telephone menu structures associated with the second party. Thus, the communication system is able to contact the proper person within each of the two parties, or provide other information required by the respective telephone menu structures in order to make the appropriate contact.

A message input structure selectively parses the first party messages received by the first party message input into different, associated memory location, and a message output structure selectively provides the first party messages in the different, associated memory locations to the first party message output. Thus, the first party is able to separately store different pieces of information in the communication system, which pieces of information are all a part of the first party messages. The different pieces of information comprising a single message are stored in a manner such that they are all associated one with another. The second party is then able to individually access the different pieces of information as desired, as they are provided to the first party message output.

A first party message playback selectively presents to the first party the first party messages, and a second party message playback selectively presents to the second party the second party messages. Thus, both the first party and the second party are able to listen to and review their own messages, so that they can change the messages before they are sent to the other party.

A second party redialer selectively causes the first party message output to repeatedly attempt to deliver the first party messages to the second party until the first party messages are successfully delivered, and a first party redialer selectively causes the second party message output to repeatedly attempt to deliver the second party messages to the first party until the second party messages are successfully delivered. Thus, the communication system does not merely attempt a single time to contact the other party, but is selectively instructable to continue in its attempts to deliver the messages to the respective parties, until either a predetermined criteria is met, or the messages are successfully delivered.

In a method of communicating information associated with a patient between a first party and a second party, a first telephone call is received from the first party with an input, and a first party message is received from the first party. The first party message is stored in a memory location. A second telephone call is placed to the second party. A telephone system menu associated with the second party is negotiated with a weave file associated with the second party. The system waits until the second party answers the second telephone call, and the second party is provided with a menu of option for delivering the first party message.

Input is received from the second party in response to the menu of options. A third telephone call is selectively placed from the second party to the first party in response to the input received from the second party. A second party message is selectively received from the second party in response to the input received from the second party. A fourth telephone call is selectively placed to the first party, and a telephone system menu associated with the first party is negotiated with a weave file associated with the first party. The system waits until the first party answers the fourth telephone call, and a menu of options for delivering the second party message is provided to the first party. Input is received from the first party in response to the menu of options, and the second party message is selectively presented to the first party in response to the input received from the first party.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION

Figure 1:
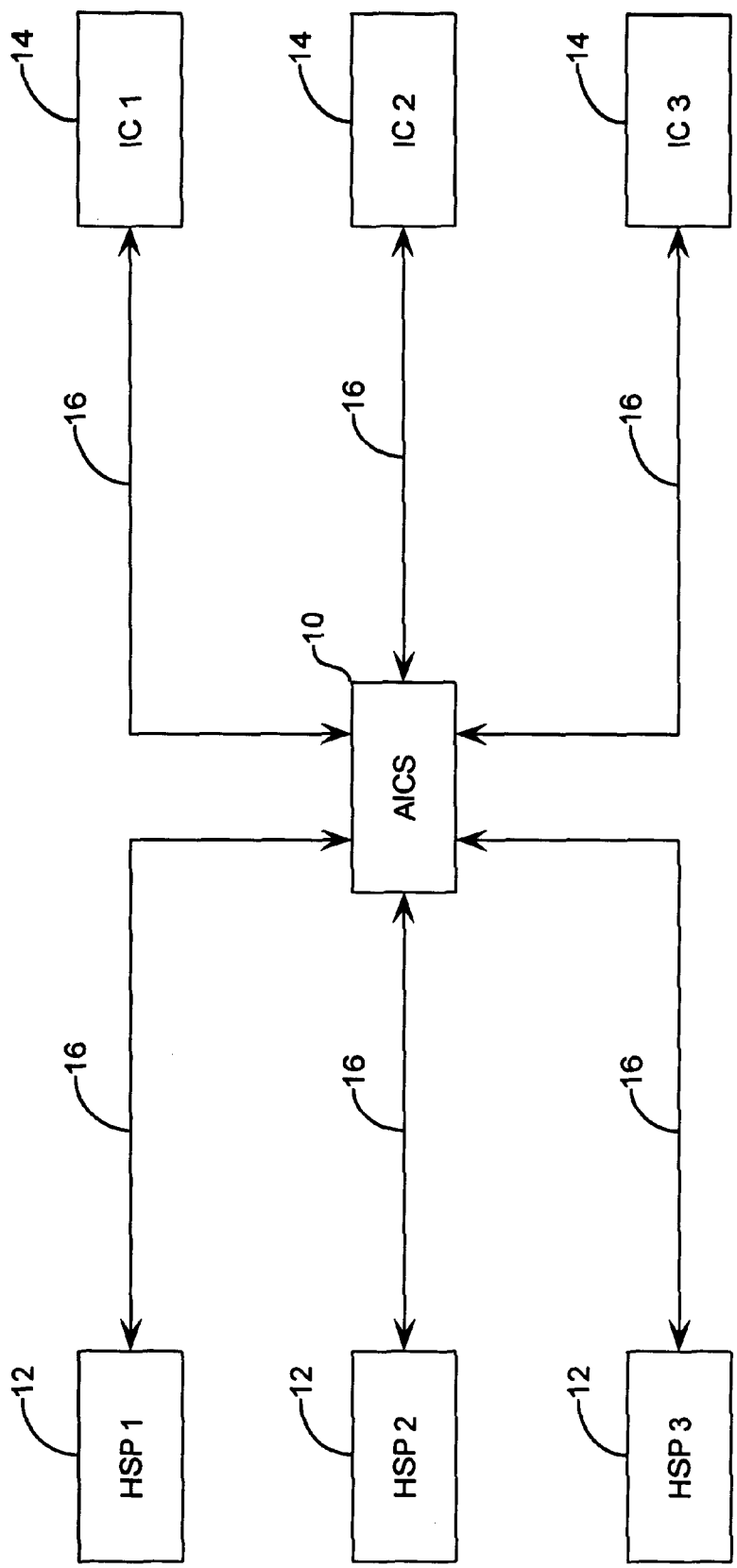
FIG. 1 functionally depicts an overview of the autointeraction communication system.

Referring now to FIG. 1, there is depicted an overview of an autointeraction communication system (AICS) 10 in communications with one or more health service providers (HSP) 12 and one or more insurance companies (IC) 14. The communication between the AICS 10, HSP's 12, and IC's 14 is conducted over lines 16. Lines 16 may be any form of electronic communication, such as without limitation, cellular, packet radio, telephone, cable, digital line, microwave, or satellite. Only three each of the HSP's 12 and IC's 14 have been depicted in FIG. 1, with only a single line 16 between each HSP 12 and IC 14 and the AICS 10. However, this has been done so as to not unduly complicate the figure. In practice, there may be any number of HSP's 12 and IC's 14 connected to the AICS 10.

The communication between the AICS 10 and the HSP's 12 is bidirectional, or in other words, messages may be sent in a direction originating with the HSP 12 and directed toward the AICS 10, or alternately, messages may be sent in a direction from the AICS 10 toward the HSP 12. Similarly, the communication between the AICS 10 and the IC's 14 is also bidirectional, such that messages may be sent in a direction originating with the IC 14 and directed toward the AICS 10, or messages may be sent in a direction from the AICS 10 toward the IC 14.

While messages have been described as flowing in both directions on all lines 16, the messages typically do not originate at the AICS 10. Instead, messages originate at an HSP 12 and are relayed through the AICS 10 and directed toward an IC 14. The IC 14 may then respond to the message in an automated fashion as described more completely below, and the response is relayed through the AICS 10 and directed toward the originating HSP 12.

One purpose of the AICS 10 is to automate communication between an HSP 12 and an IC 14, so that each may function more efficiently. For example, in the health service industry there are several occasions when an HSP 12 must communicate with an IC 14. The HSP 12 must convey certain information to the IC 14, in response to which the IC 14 provides information back to the HSP 12. As a specific example, an HSP 12 will typically call an IC 14 for a verification of benefits provided by the IC 14 for a new patient. The HSP 12 will provide certain information to the IC 14, such as the patient's name, the patient's social security number, and the type of services that are anticipated to be provided. The HSP 12 will then require certain information in response. Specifically, the HSP 12 may want to know if the patient is indeed insured by the IC 14, whether the anticipated services are among those covered by the IC 14, and whether the services must be precertified before payment will be made. In response to the information provided by the HSP 12, the IC 14 will provide the answers which the HSP 12 requests.

At a later point in time, the HSP 12 may need to contact the IC 14 again, provide additional information to the IC 14, and receive additional responses from the IC 14. For example, if during the verification of benefits the IC 14 indicated that precertification was required before payment would be rendered for a given health care service, the HSP 12 will call the IC 14 prior to rendering the service, provide the information required by the IC 14, and receive an authorization number in response. Without the authorization number, the HSP 12 will typically not be paid by the IC 14 for the services rendered to the patient. While making the precertification call to the IC 14 for the authorization number, the HSP 12 will typically provide to the IC 4 the patient's name, the patient's social security number, demographic information about the patient, and clinical information about the patient.

The demographic information includes such things as information about the HSP 12 so that the IC 14 can properly identify the HSP 12, and determine whether the HSP 12 is qualified to receive payment from the IC 14. In addition, the information necessary for the IC 14 to contact the HSP 12 is given, so that the IC 14 can reach the HSP 12 should the call be disconnected, or should the IC 14 require additional information at a later time. Such identifying information may include the name, address, and telephone number of the HSP 12, the name of the HSP 12 employee placing the telephone call, and any identifying number given the HSP 12 by the IC 14. Specific information about the patient is also given, such as the patient's date of birth, the attending physician, the referring physician, the referral number, and the anticipated date on which the services will be rendered.

The clinical information includes information such as the type of services which the HSP 12 anticipates providing to the patient, a summary of the examinations which have been conducted, the symptoms which have been discovered during those examinations, a diagnosis of the conditions producing the symptoms, and a description of the services to be performed to correct the conditions.

The HSP 12 may have further reason to contact the IC 14 in addition to the verification of benefits and precertification described above. For example, after the services have been rendered by the HSP 12, and the HSP 12 has submitted a claim to the IC 14 for the payment for the services, the HSP 12 may need to contact the IC 14 to determine the status of the submitted claim. In such a transaction, the HSP 12 must typically provide to the IC 14 certain information such as the patient's name, the patient's social security number, the date on which the services commenced, the date on which the services ended, and the amount of the claim submitted for payment of the services. In response to this information, the IC 14 will provide a status update on where the claim is in the IC's 14 organization.

Repeatedly contacting the IC 14, providing the required information, and receiving the desired information in response is time consuming and expensive for an HSP 12. For example, while it may only take a few minutes for the actual exchange of information between the HSP 12 and the IC 14, the HSP 12 is competing with perhaps thousands of other HSP's 12 who are similarly trying to contact the IC 14. Thus, the HSP 12 is typically put on hold after contacting the IC 14, and must wait until one of the IC 14 employees is available to speak with the HSP 12. The amount of time spent on hold by the HSP 12 employee is typically far longer than the amount of time which is required to exchange the information. Thus, the HSP 12 must pay an employee to sit on hold for great lengths of time, during which very little productive work may be accomplished.

Because HSP's 12 typically have a great number of patients, and must repeatedly make the telephone calls described above to the IC's, 14 the HSP 12 may have to hire additional employees whose only job is to call the many different IC's 14 used by the different patients. While a relatively low degree of training is required to make the verification of benefits or the claim status calls, a relatively high degree of training is required to make the precertification calls to the IC 14. This is because the person making the call must interpret the patient's chart as written by the doctor and others. Typically a nurse is called upon to make the precertification call. Thus, the HSP 12 has a relatively high monetary investment in the time required for the nurse to make the call. In addition, the nurse is kept from more productive activities during the time spent making the call. Again, most of that time is spent just sitting on hold.

One of the purposes of the AICS 10 is to allow the HSP 12 to provide its information to the IC 14 in such a manner that the HSP 12 does not have to wait for the immediate attendance and response of the IC 14. The HSP 12 calls the AICS 10 and provides all the required information to the AICS 10, instead of providing the information directly to the IC 14. The AICS 10 records all of the information provided by the HSP 12, and then the HSP 12 employee hangs up. Thus, the HSP 12 employee is able to immediately resume his duties after providing the information to the AICS 10. The AICS 10 then calls the appropriate IC 14 as identified by the HSP 12. Typically, the AICS 10 is placed on hold after reaching the desired IC 14. When the IC 14 is ready to receive the information, the AICS 10 relays the information provided by the HSP 12 to the IC 14. The IC 14 then gives in response the information desired by the HSP 12, such as a precertification authorization number. The AICS 10 records this information, and the IC 14 employee then hangs up. The AICS 10 then calls the originating HSP 12 and delivers the information from the IC 14.

One benefit of the invention is that neither the HSP 12 employee nor the IC 14 employee spends any time waiting for the availability of the other. Instead, each of the two employees delivers their information at their convenience, and the AICS 10 is used as the go between, waiting until each of the HSP 12 and the IC 14 are ready to receive and respond to information. Thus, the HSP 12 employees, such as the nurses which must make the precertification calls, are freed from the unproductive time spent on hold, and are available to do more productive work.

As depicted, the AICS 10 is an outside service or apparatus to which several different HSP's 12 are connected. As stated, the AICS 10 may be a service which is provided by employees of the AICS 10, or the AICS 10 may be an apparatus specifically constructed and adapted to provide the functions generally described above, and more specifically described below. Further, the AICS 10 may be a computer program, either in a memory or on a media, running on a computer, which program reconfigures the computer to provide the functions described. For example, the AICS 10 may be hosted on a standard personal computer which has been fitted with electronics for voice telephony and programming to control the specific hardware to accomplish the desired functions. Dialogic Corporation of Parsippany New Jersey makes such voice telephony electronics, such as the DIALOG/4 board. Programming may be accomplished in a compatible language, such as SPL provided by Expert Systems, Inc. of Georgia. Examples of an SPL program which will enact the functions described herein are provided in the microfiche appendix.

Alternately, the AICS 10 may be dedicated to a single HSP 12, and may be located on the premises of the HSP 12. For example, the AICS 10 may be made a part of the telephone system of a single HSP 12, such that when the functions of the AICS 10 are required by the HSP 12, the HSP 12 merely dials an internal extension, and is connected to the AICS 10. Further, the AICS 10 may be distributed across several locations, with portions of the AICS 10 within the facilities of the HSP's 12, and portions of the AICS 10 located at one or more remote sites. All such combinations and subcombinations are within the scope of the disclosure made herein.

While the examples above may be specific to the health service industry, it is understood that the invention is not strictly limited to that industry, or to the specific examples within that industry as described above. Rather, the invention provides utility to a wide range of industries and applications.

Figure 2:
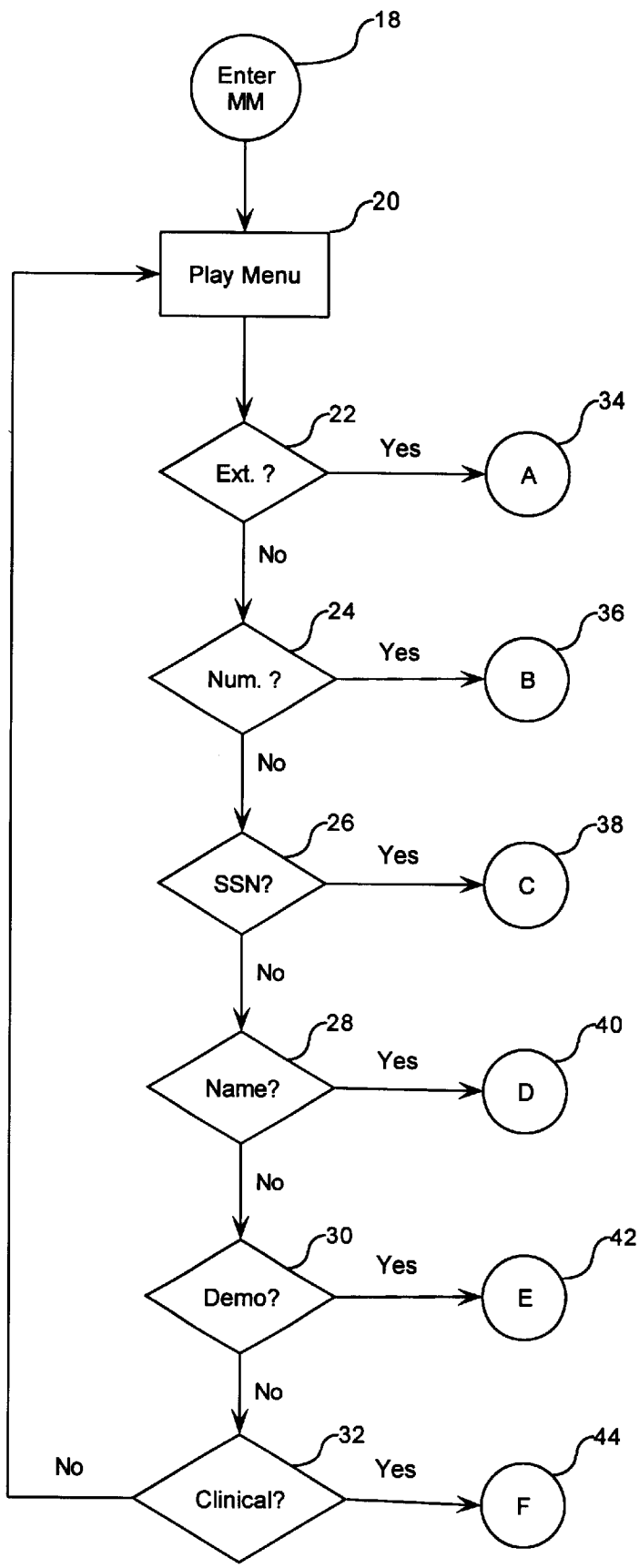
FIG. 2 functionally depicts the main menu of the autointeraction communication system.

Turning to FIG. 2, the elements of the invention will now be more fully described. FIG. 2, like many of the other figures, is presented in the format of a flow chart. As such, it provides an overview of one or more embodiments of the invention. For example, the flow charts provide an overview of program code, residing in a memory or on a media, which is useful for configuring a computer. Further, the flow charts in the figures functionally depict an apparatus which is specifically constructed to implement the functions represented by each element of the flow charts, and described in this specification. Further, the flow charts also depict steps of a method to be conducted in implementing the functions herein described. Thus, it will be appreciated that the description as provided herein and the figures are not strictly limited to any one specific embodiment of the invention.

The process is initiated at the entry point 18 to the main menu of the AICS 10 system. This is typically done by the HSP 12 placing a telephone call to the AICS 10. The main menu is played in block 20. In the main menu, several options are made available to the HSP 12. For example, the HSP 12 may be requested to leave an identifying number, such as a telephone number or an extension number, as in block 22. This can be done with a familiar dialog, such as "press 1 to enter your extension." If the appropriate input is given, the system proceeds to another part of the method, represented by block 34.

Other options are also presented in the main menu. For example, the telephone number, or other identifying number of the IC 14 is requested in block 24. This may also be done in the manner described above, such as "press 2 to enter the numeric code for the insurance company to be contacted." All other such decision blocks described hereafter may be selected in a similar manner as that described, and such detailed description will be omitted below for subsequent similar functions. If the HSP 12 indicates that the IC 14 number is to be entered in response to block 24, then program control proceeds to block 36.

Similarly, the HSP 12 can indicate to enter the patient's social security number as in block 26, the patient's name as in block 28, the patient's demographic information as in block 30, and the patient's clinical information as in block 32. In each instance, if the HSP 12 indicates to enter the information, program control continues to blocks 38, 40, 42, and 44 respectively. If the HSP 12 does not indicate to enter any of the requested information, the apparatus replays the main menu and again describes the available options. It will be appreciated that the information depicted in FIG. 2 is by way of example only, and is somewhat specific to the health care industry. More information, less information, or different information could also be requested, and the playback of the main menu would be adjusted accordingly.

In a most preferred embodiment, the AICS 10 does not present the HSP 12 with the option to enter the information in a randomly selectable fashion, but instead conducts the HSP 12 along a program path where all of the information is requested in a serial fashion. For example, in this preferred embodiment the AICS 10 automatically selects in block 22 to transfer program control to block 34, where the extension information is input to the AICS 10. Then, as each item of information is received, the AICS 10 automatically selects to transfer program control to the next information input routine. Thus, after receiving the extension information per the routine represented by block 34, as described in more detail below, control is automatically transferred to the routine represented by block 36, which receives the number to be called, also as described in more detail below.

Figure 3:
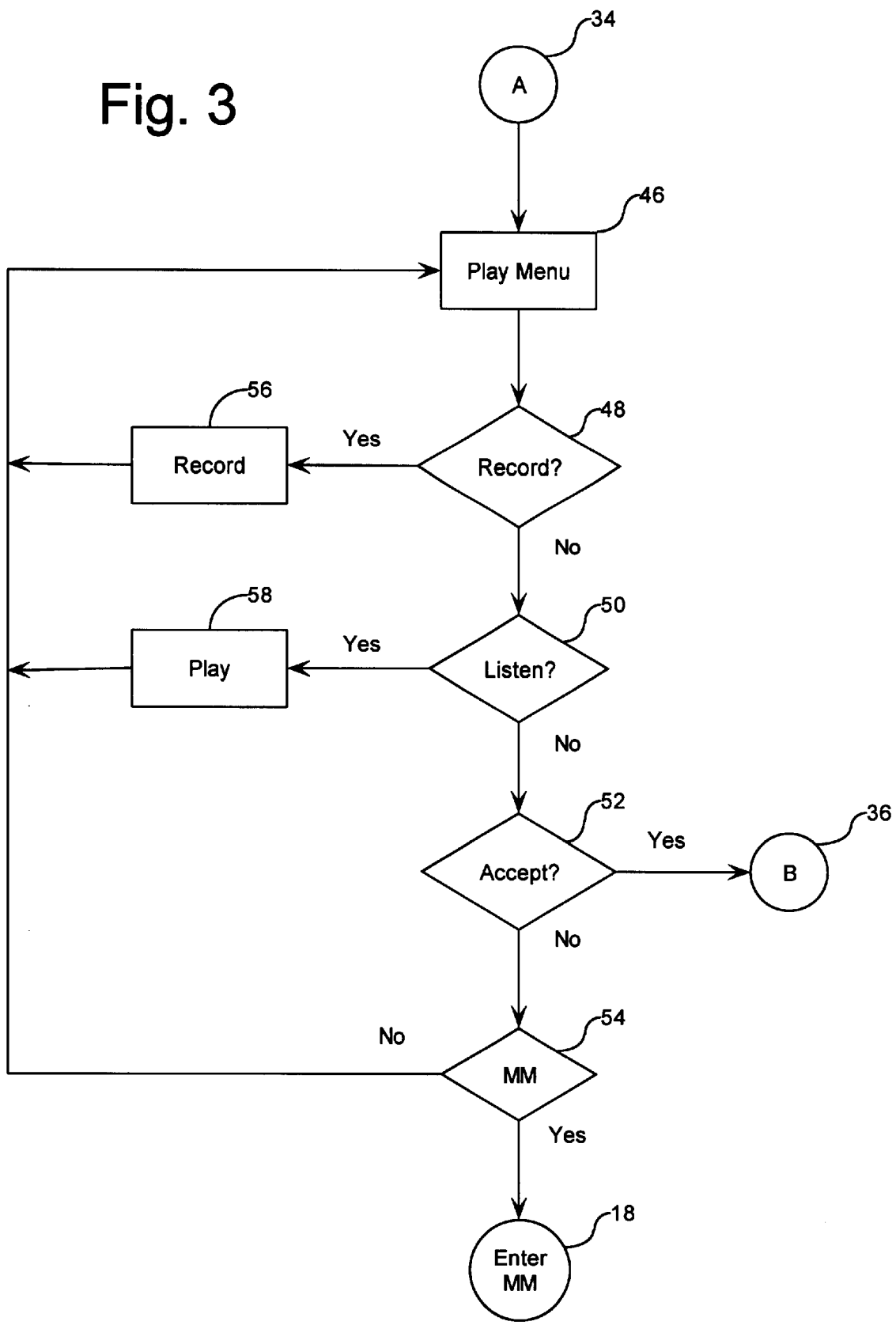
FIG. 3 functionally depicts a first data entry means of the autointeraction communication system.

FIG. 3 depicts the method of entering data, such as the extension requested in block 22 of FIG. 2. Block 34, depicted in both FIGS. 2 and 3 is the entry point into this function of the AICS 10. The menu is played in block 46 for this portion of the data entry, as depicted in FIG. 3. Similar to that as described above, the menu presents the HSP 12 with several different options to continue. For example, the HSP 12 may elect in block 48 to record the desired information, at which point control is passed to block 56, in which means are employed to record the extension or telephone number from which the HSP 12 is calling.

Several different methods may be employed to record the information. For example, the HSP 12 may be prompted to use the numeric keypad on the telephone to enter the extension, or may be prompted to speak the extension number. The information provided may be recorded by an apparatus, such as on a tape or digitally in a memory or on a media, or may be written down by a human operator at the AICS 10. While these various methods of recording will not be individually explained for all of the similar steps described hereafter, it will be appreciated that such options are equally applicable to those similar steps.

The HSP 12 may select in block 50 to listen to the extension which has been recorded in block 56. The extension is played back in block 58. After either recording in block 56 or playback in block 58, control is again returned to block 46, which replays the options in the menu. The HSP 12 may select to accept the recorded message in block 52, which passes control on to another part of the program in block 36. In the example depicted, block 36 represents the data entry portion of the program for the telephone number or other identifying number of the IC 14 to be contacted, as initially described for the like-numbered element in FIG. 1. The HSP 12 may also select to return to the main menu in block 54, which passes control to the main menu entry point represented by block 18. If the HSP 12 does not select any of the option presented in the menu of FIG. 3, then the menu is replayed until a selection is made by the HSP 12, or a predetermined amount of time elapses.

Figure 4:
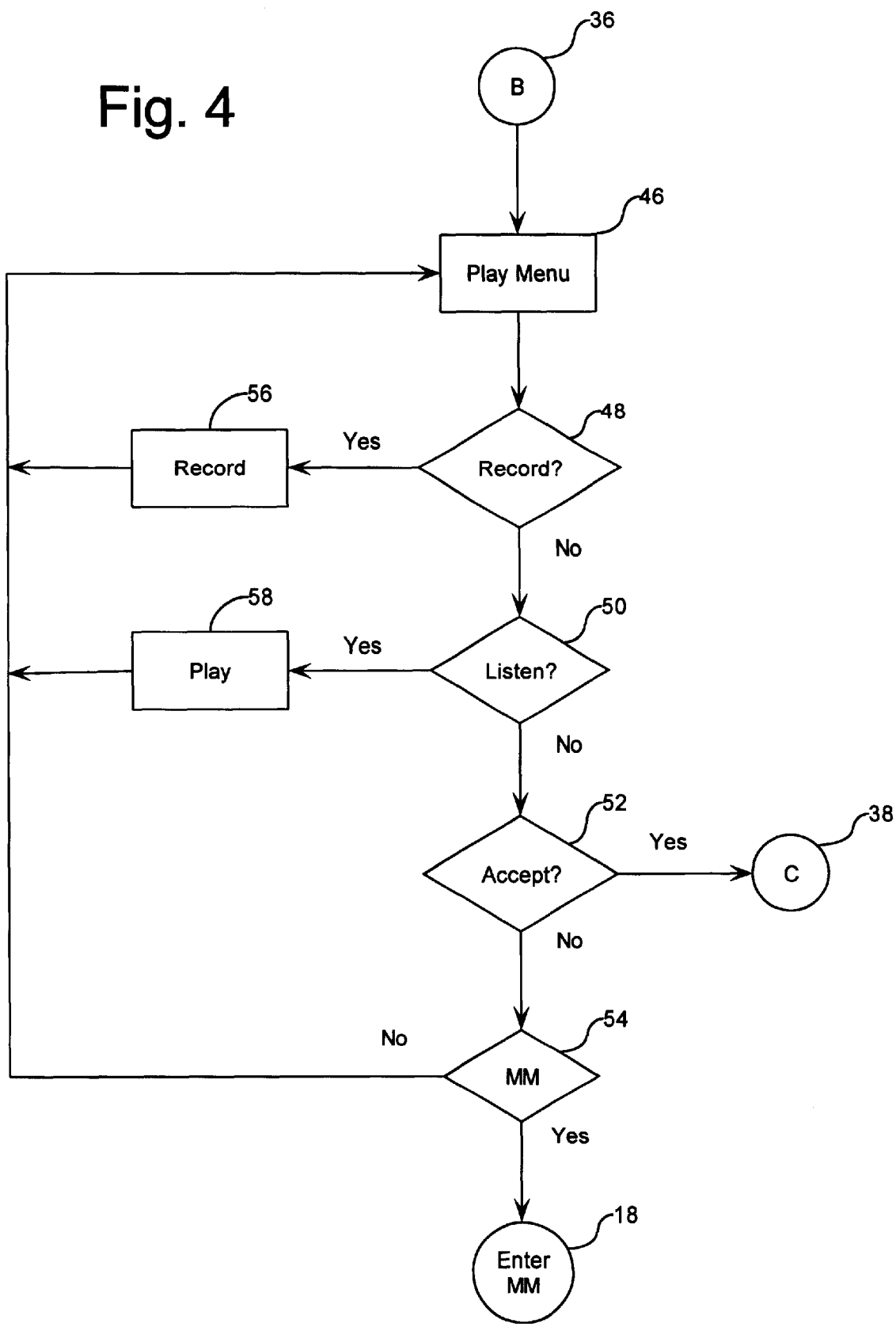
FIG. 4 functionally depicts a second data entry means of the autointeraction communication system.
Figure 5:
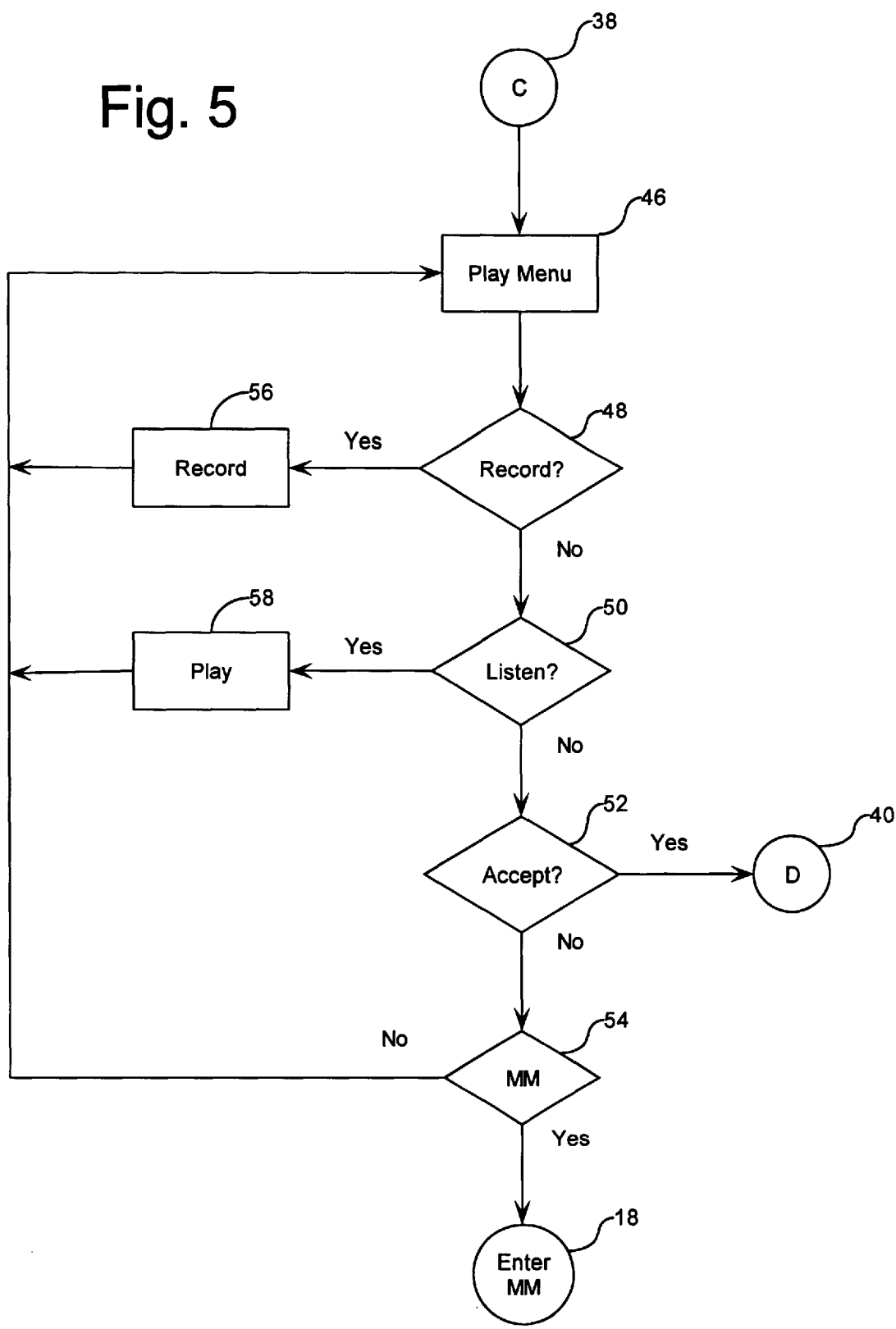
FIG. 5 functionally depicts a third data entry means of the autointeraction communication system.

FIG. 4 depicts the data entry routine wherein the telephone number or other identifying number for the desired IC 14 is entered. Thus, block 36 on FIG. 4 is the same as block 36 on FIGS. 2 and 3, and represents the entry point to this portion of the data entry means. Options similar to those described above are presented to the HSP 12 in this menu. In other words, the HSP 12 is again presented with the option to select in block 48 to record the information in block 56; to select in block 50 the option to play in block 58 the information recorded in block 56; to select in block 54 the option to return to the main menu in block 18; and to select in block 52 the option to proceed to another function of the apparatus of the AICS 10, represented by block 38.

It will be appreciated that the apparatus described in FIG. 4 is very similar to that described in FIG. 3. This is not necessarily the case, and fewer, more, or different options may be presented to the HSP 12 in each menu, depending upon the type of information desired, and the degree of program control desired to be granted to the HSP 12. Further, several of the different elements depicted in FIGS. 3 and 4 have been given the same reference number, as they perform similar functions. In actual practice, the elements may indeed be the exact same element that are used for the different portions of data entry. These common elements may receive an identifier of some type, such as a different value in a flag or other variable that is set, which identifies to the common elements which piece of information is to be recorded, and which portion of the program to pass control to upon acceptance of the piece of information. Alternately, the elements of each data entry module may be entirely separate and distinct from the elements of all other data entry modules, and be wholly dedicated to the entry of just a single piece of information. While the elements depicted in FIGS. 3 and 4 have been given like reference numbers throughout so as to reduce confusion, it will be appreciated that all embodiments such as those described above are contemplated.

Figure 6:
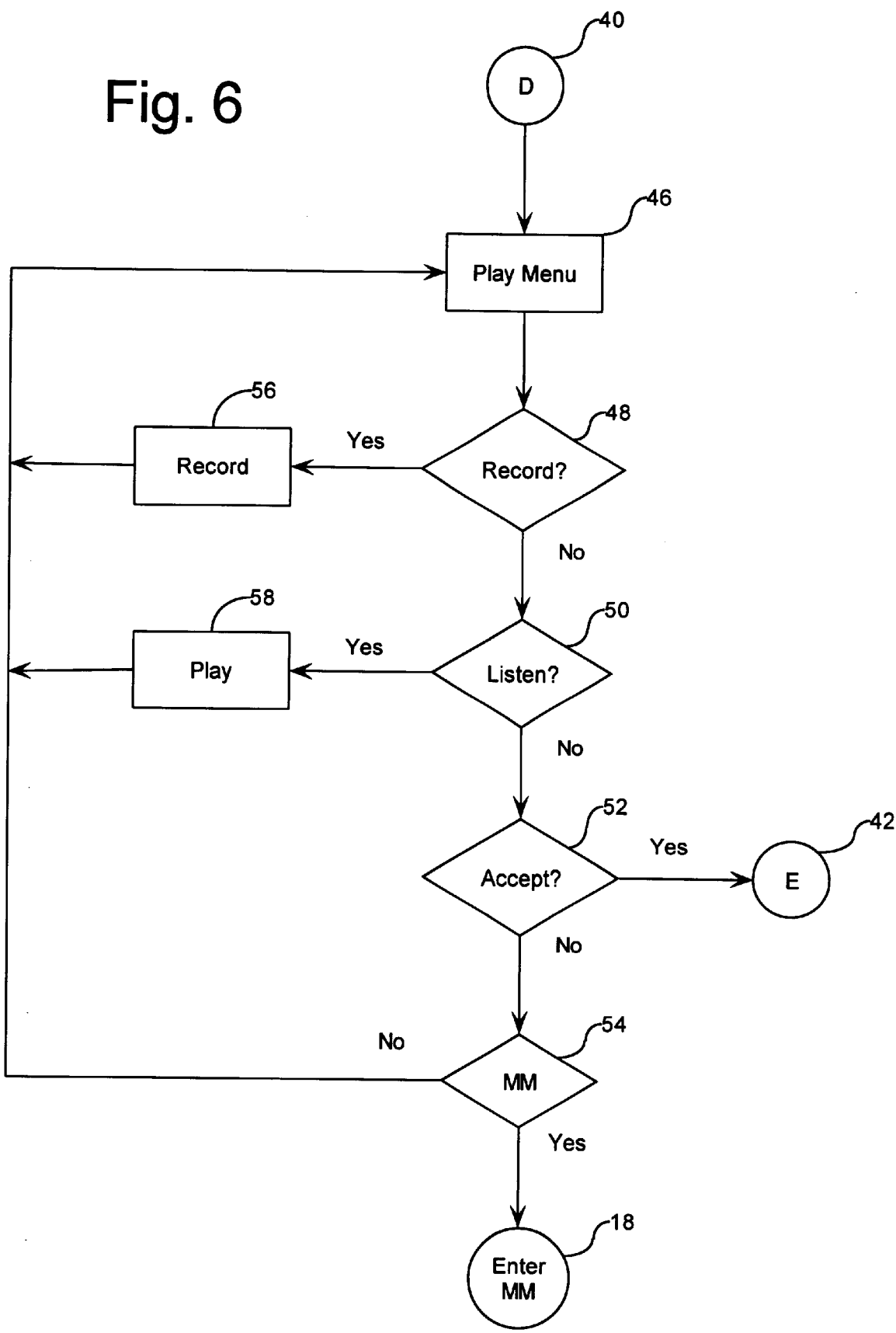
FIG. 6 functionally depicts a fourth data entry means of the autointeraction communication system.
Figure 7:
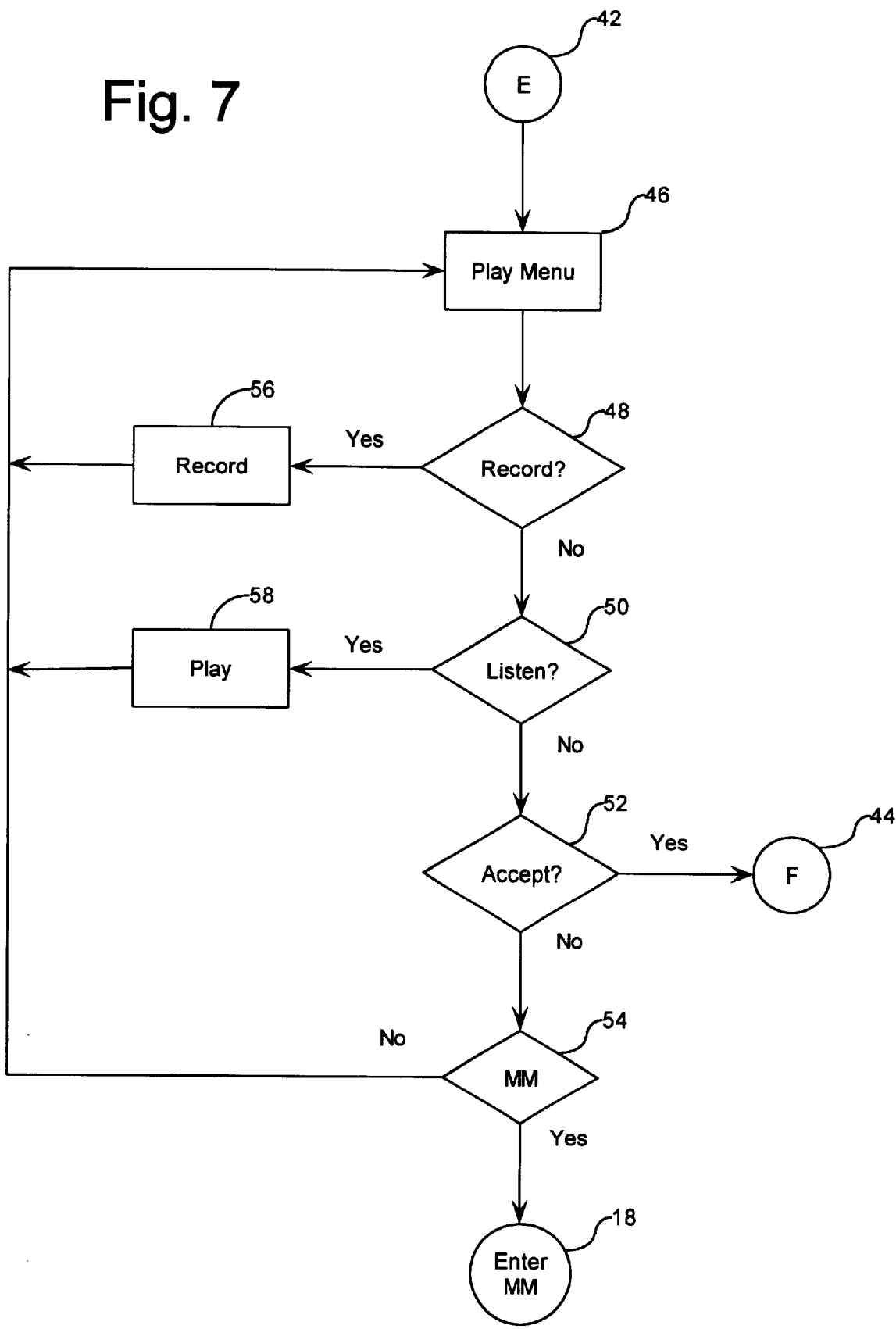
FIG. 7 functionally depicts a fifth data entry means of the autointeraction communication system.
Figure 8:
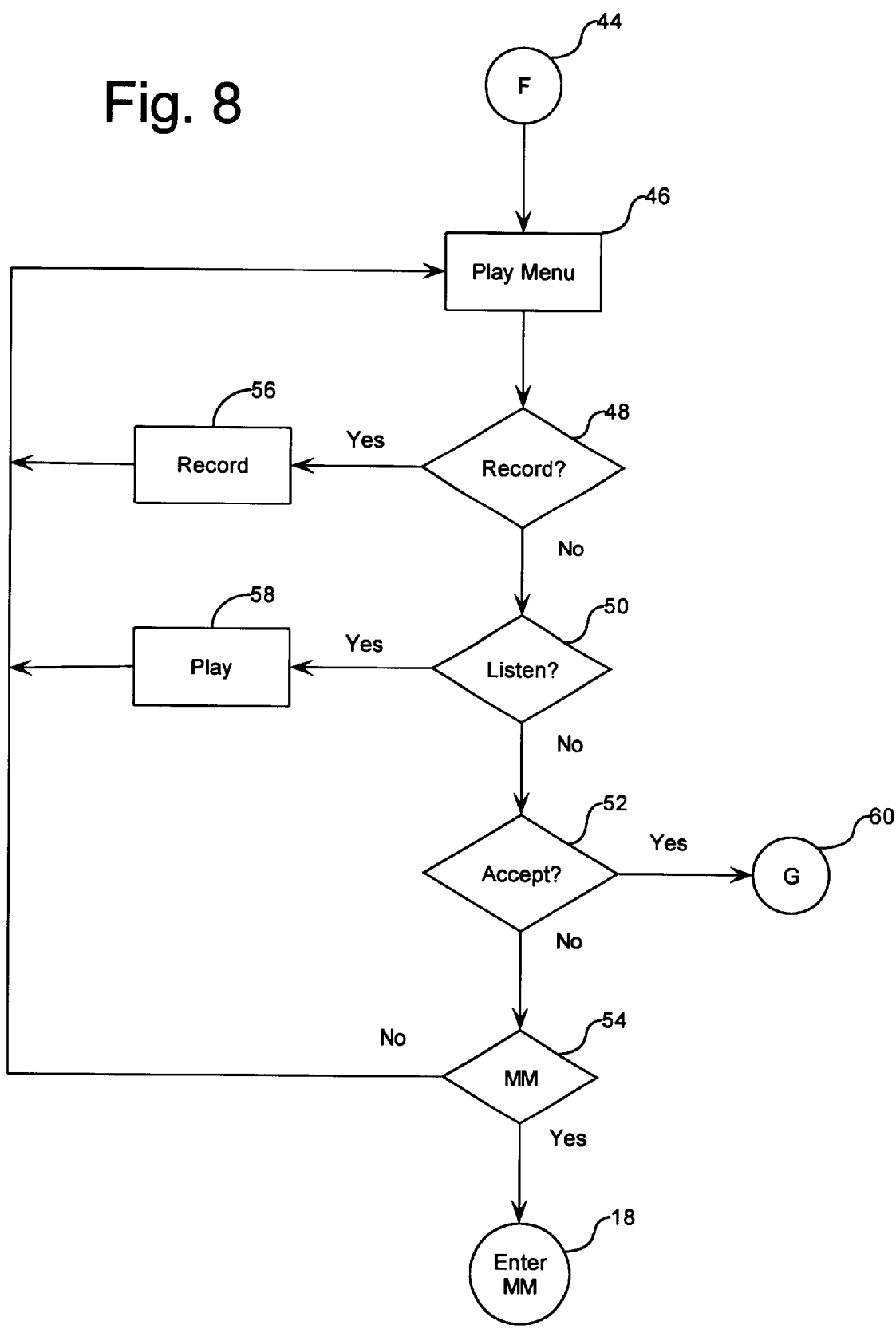
FIG. 8 functionally depicts a sixth data entry means of the autointeraction communication system.

FIGS. 5–8 depict the methods of data entry for the other pieces of information as requested in the main menu of FIG. 2, and are similar to the data entry means described above for FIGS. 3 and 4. Specifically, in FIG. 5 there is depicted the data entry means for the patient's social security number, which routine is entered in block 38. Upon acceptance of the data, program control continues through block 40. In FIG. 6 there is depicted the data entry means for the patient's name, which routine is entered in block 40. Upon acceptance of the data, program control continues through block 42. In FIG. 7 there is depicted the data entry means for the patient's demographic information, which routine is entered in block 42. Upon acceptance of the data, program control continues through block 44. In FIG. 8 there is depicted the data entry means for the patient's clinical information, which routine is entered in block 44. Upon acceptance of the data, program control continues through block 60.

Figure 9:
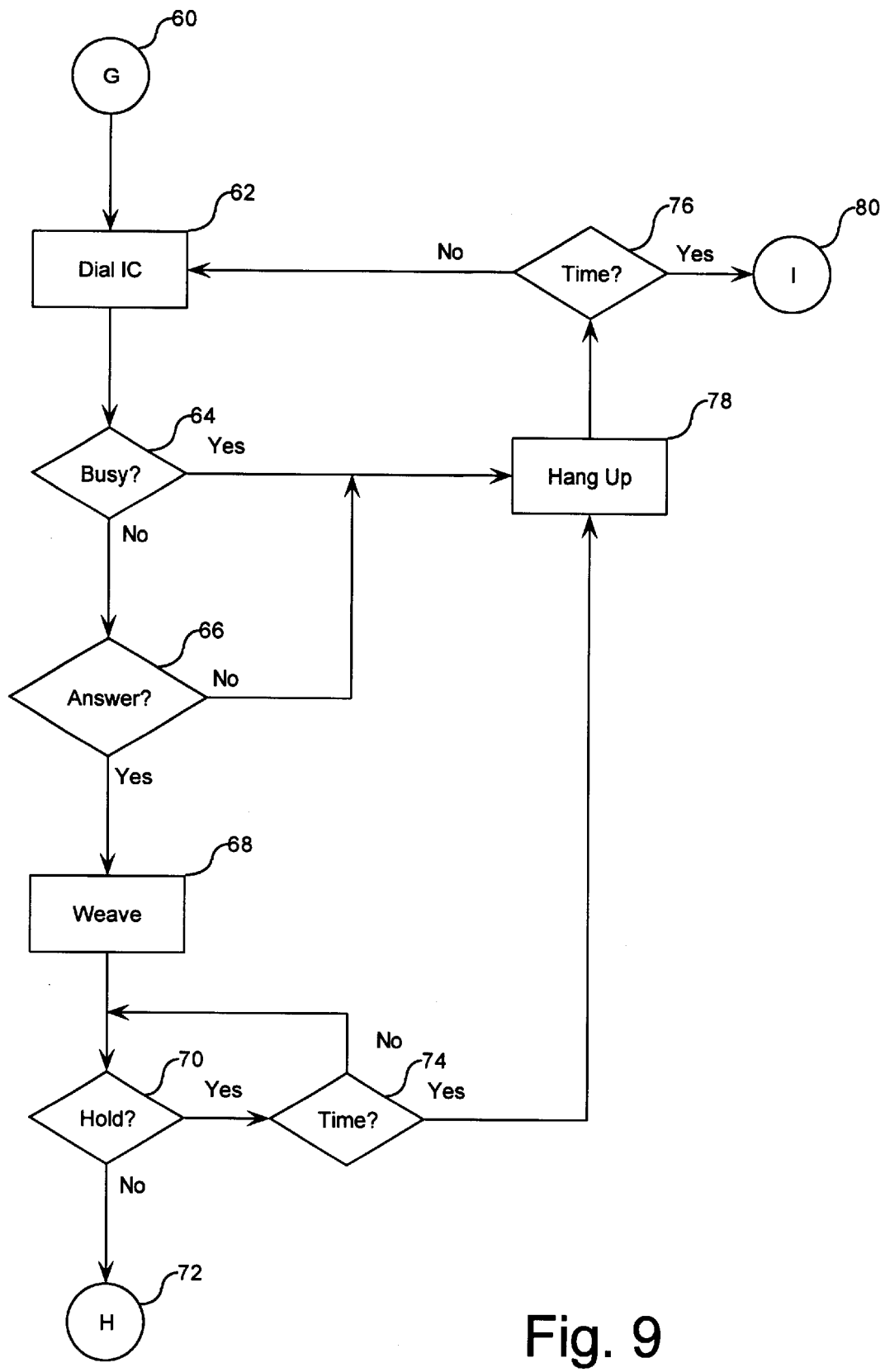
FIG. 9 functionally depicts the automated outbound dialing of the autointeraction communication system.

The entry point depicted by block 60 in FIG. 9 represents that point in the method at which the HSP 12 may hang up the telephone, or otherwise stop communicating. All of the information necessary for the IC 14 to provide a response, such as a precertification authorization, has been entered. The method typically requires just a few minutes to accomplish, after which the HSP 12 may attend to other business. Alternately, the HSP 12 may elect to accept the data that has been entered and send it on its way, and to then reenter the main menu at block 18, and begin anew the process of recording information relating to another patient or IC 14. The continuation of the method proceeds without regard to the further actions of the HSP 12, unless the HSP 12 communicates to the AICS 10 that the information recorded should be deleted or otherwise not transferred to the IC 14.

As depicted in FIG. 9, the AICS 10 dials the IC 14 in block 62. The AICS 10 uses the information given it by the HSP 12 in making the call. For example, if the HSP 12 was prompted to enter an actual telephone number, then this telephone number is used to dial the IC 14. Alternately, if the HSP 12 was prompted to enter some other type of information which identified the appropriate IC 14, then the AICS 10 could compare that identifying information to a previously stored database of such information, and from that database extract the information necessary to call the IC 14 in block 62.

The AICS 10 is operable to detect the status of the telephone call placed in block 62. For example, the AICS 10 can detect in block 64 whether the number to which it is attempting to connect is busy. Further, the AICS 10 can detect in block 66 whether the number which it is trying to connect to is ever answered. Routines to implement these functions described are provided in the microfiche appendix.

If the number dialed is busy, then the call is disconnected in block 78. Control is also passed to block 78 if the IC's 14 telephone is not answered within a given number of rings, or within a specified length of time. In block 76 a determination is made as to whether the maximum number of attempts to contact the IC 14 have been made, or whether the maximum length of time designated to attempt contact with the IC 14 has been exceeded. If not, then the AICS 10 again dials the IC 14 in block 62, and the method repeats. If the maximum tries or time has been exceeded, then program control is passed to block 80.

At this point one of several different events may occur. For example, a message may be sent back to the HSP 12 indicating that the information provided could not be forwarded to the IC 14. The HSP 12 may review the information presented, and may discover an error in the information, such as in the telephone number given for the IC 14, which prevented the AICS 10 from properly contacting the IC 14. In this case, the errant information may be corrected, and the AICS 10 may again attempt to contact the IC 14 as described. In alternate embodiments, there is no maximum number of attempts or length of time given to contact the IC 14, and control always passes from block 76 to block 62.

When the telephone call is answered by the IC 14, it is typically done by an automated attendant, which provides choices to the calling party, such as "dial 1 for verification of benefits, 2 for precertification, 3 for claim status," etc. Such an automated attendant would frustrate the attempts to provide information to the IC 14 by a static device which merely called a telephone number and played back recorded information. To accommodate the use of such automated attendants, the AICS 10 has a weave file associated with the IC 14, which is executed in block 68.

The weave file contains information about the automated menu structure of the IC 14 which it has called. Therefore, based on the information provided by the HSP 12, the AICS 10 can input the keystrokes necessary to navigate the automated menu structure of the IC 14, so as to arrive at the proper queue to deliver the information from the HSP 12. This may require the input to the IC 14 of a series of several different digits by the AICS 10. In addition, it may require the input of information of a more substantive nature, such as the patient's social security number or the HSP's identification number. If such information is required to be entered to the menu structure of the IC 14, such as by entering the information on the keypad of the telephone, then the AICS 10 can provide this information to the IC 14. The weave file can be programmed to provide this information from the information supplied by the HSP 12.

Such information required to navigate the IC's 14 menu structure is preferably entered into the AICS 10 by the HSP 12 in the same manner in which it must be given to the IC 14. For example, if the IC 14 requires spoken information, then the corresponding information is preferably gathered from the HSP 12 and stored by the AICS 10 in a spoken format. If, however, the information required to navigate the IC's 14 menu structure is required in a format such as entered from the keypad of the telephone, then the corresponding information is preferably gathered form the HSP 12 and stored by the AICS 10 in the same format.

The weave file used to navigate the IC's 14 menu structure in block 68 is preferably created manually, such as by a person listening to and writing down all of the different options in the menu structure. Then, different weave files can be created to access all the different queues required for all of the different IC's 14 required. These weave files are then associated to the information entered by the HSP 12. This may be done by collecting from the HSP 12 a code designating the type of call to be made, such as a verification of benefits, precertification, or claim status, and choosing the correct weave file based on this code and the telephone number or other identifying number provided for the IC 14 to be contacted.

For example, the HSP 12 may be asked by the AICS 10 to enter "1 for verification of benefits, 2 for precertification, or 3 for claim status." The AICS 10 also requests the number for the IC 14, as described above. Armed with the information designating a specific IC 14, and a specific task to be accomplished, the AICS 10 can retrieve the weave file that has been specifically written to accomplish that task with the IC 14 designated. Alternately, the weave files may be automatically generated, or automatically negotiated at the time of connection to the IC 14, by an AICS 10 having input/output and processing means sufficient to accomplish the task.

After the AICS 10 has successfully negotiated the menu structure at the IC 14, the call is typically placed in a holding queue to await the availability of an employee of the IC 14. In one embodiment, the AICS 10 detects that the call has been placed on hold, and waits until the call is answered in block 72 to deliver the information. In an alternate embodiment, a brief menu of information is continually presented at this point, so that when the call is eventually answered, the answering employee of the IC 14 can quickly ascertain the nature of the call, and how to proceed. The length of time during which the call is on hold is preferably monitored by the AICS 10, such as in block 74. If the time on hold exceeds a given maximum length of time, such as 50 or 60 minutes, then the AICS 10 disconnects the call as in block 78, and enters the decision routines as previously described. If, however, the maximum length of time has not been exceeded in block 74, the AICS 10 either continues to wait for the call to be answered, or continues to repeatedly play the brief informational message, also as described above.

Figure 10:
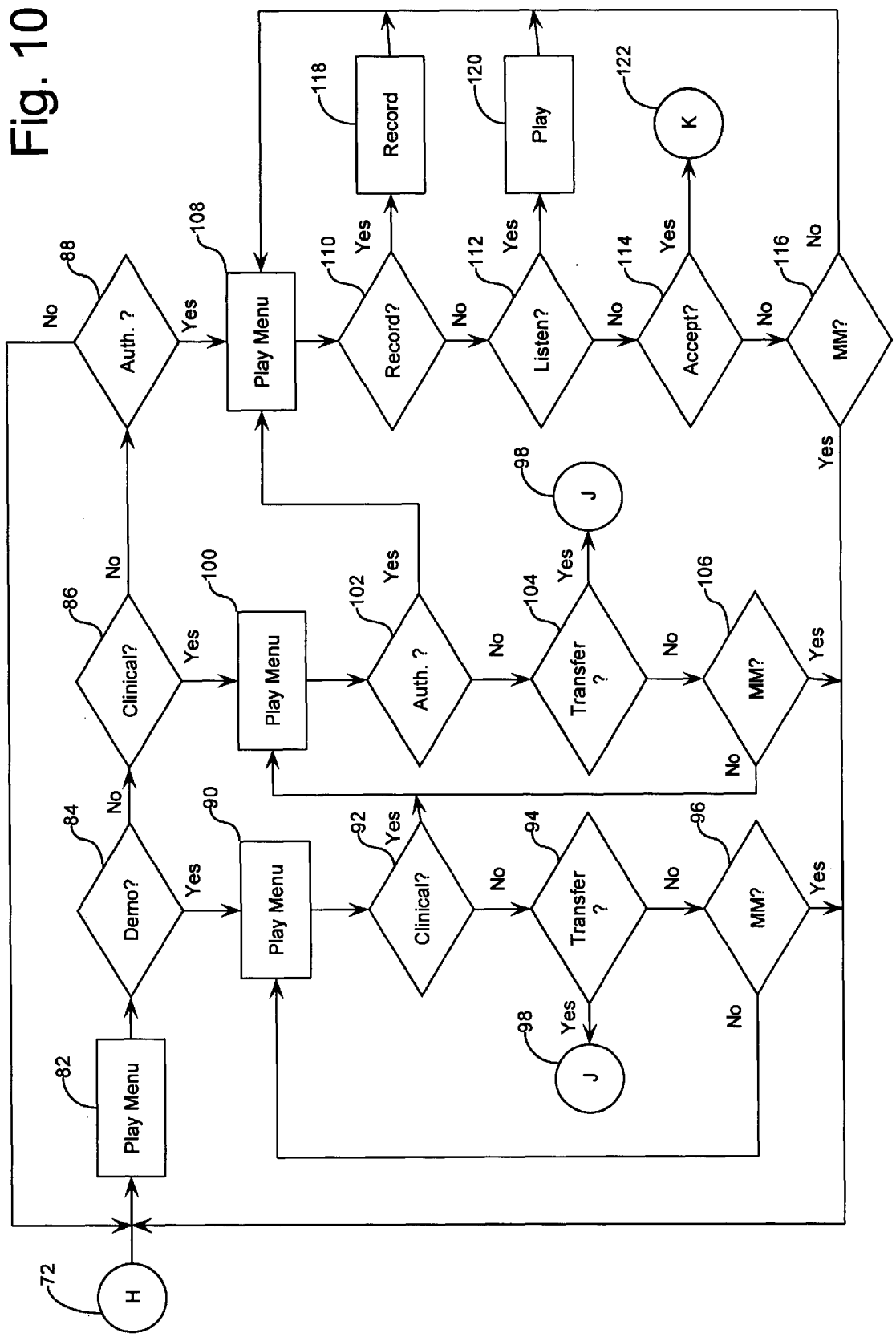
FIG. 10 functionally depicts the data delivery of the autointeraction communication system.

The IC 14 receives the information provided by the HSP 12 by entering the information playback menu in block 72, depicted in FIG. 10. The menu is presented in block 82, and provides options for selection by the IC 14 of information to be provided to the IC 14. For example, the menu may present the option for selection of playback of the patient's demographic information as in block 84, selection of playback of the patient's clinical information as in block 86, or selection to record a precertification authorization number as in block 88. If the IC 14 does not make a selection, either by choice or because the call is still on hold, then the menu repeats the brief message and the options to be selected.

Upon selection by the IC 14 in block 84 to listen to the demographic information, the IC 14 is presented with the information recorded earlier by the HSP 12. If the information is sufficient to the IC 14, then the IC 14 can select in block 92 to listen to the patient's clinical information. If for some reason the information is not sufficient to the IC 14, then the IC 14 may select in block 94 to be transferred directly to the HSP 12 in block 98, according to a method which will be described more completely hereafter. The IC 14 is also presented with the option in block 96 to return to the main menu, in which the option to hear demographic or clinical information, and record and authorization number are again presented. If the IC 14 does not select any of the options presented, then the play menu 90 is reentered, and the demographic information is repeatedly presented to the IC 14 until either an option is selected or some predetermined event, such as a maximum length of time or maximum number of repetitions is encountered in the presentation of the information.

If the IC 14 selects the option to listen to the patient's clinical information, either by selecting block 86 or selecting block 92, then the clinical information recorded by the HSP 12 is presented to the IC 14 in block 100. Similar options to transfer in block 104 or to return to the main menu in block 106 are presented to the IC 14. Upon the selection of a transfer in block 104, the control is passed to block 98, as mentioned above, and as will be more completely described below. A different option is also provided to select in block 102 to record the precertification authorization number. It will be appreciated that this option may be presented as a part of the menu 90 for the demographic information as well. Further, an additional option may be presented as a part of the menu 100 for the clinical information to transfer to the menu 90 of the demographic information.

Upon entry through either block 88 or block 102 to the authorization menu 108, the IC 14 is again presented with a slate of options from which to choose. The IC 14 may select in block 110 to record the authorization number in block 118, to select in block 112 to listen to the playback of the recorded authorization number in block 120, to select to accept in block 114 the authorization number, or to select in block 116 to return to the main menu. If the IC 14 selects in block 114 to accept the recorded authorization number, then control of the program continues to block 122, as will be described more completely hereafter. An option may also be provided in the authorization menu for the IC 14 to select to transfer to the HSP 12, as mentioned above for block 98.

The demographic information for the patient presented to the IC 14 in block 90 and the clinical information for the patient presented to the IC 14 in block 100 may be quite lengthy. The IC 14 may be required to type in the information as it is presented, so that the IC 14 has a record of the transaction. Although the information will repeatedly be presented in a cyclical fashion if the IC 14 does not select one of the options to exit the menu, the IC 14 may wish to alter the presentation of the information, rather than to merely wait for the information to be presented again.

Figure 11:
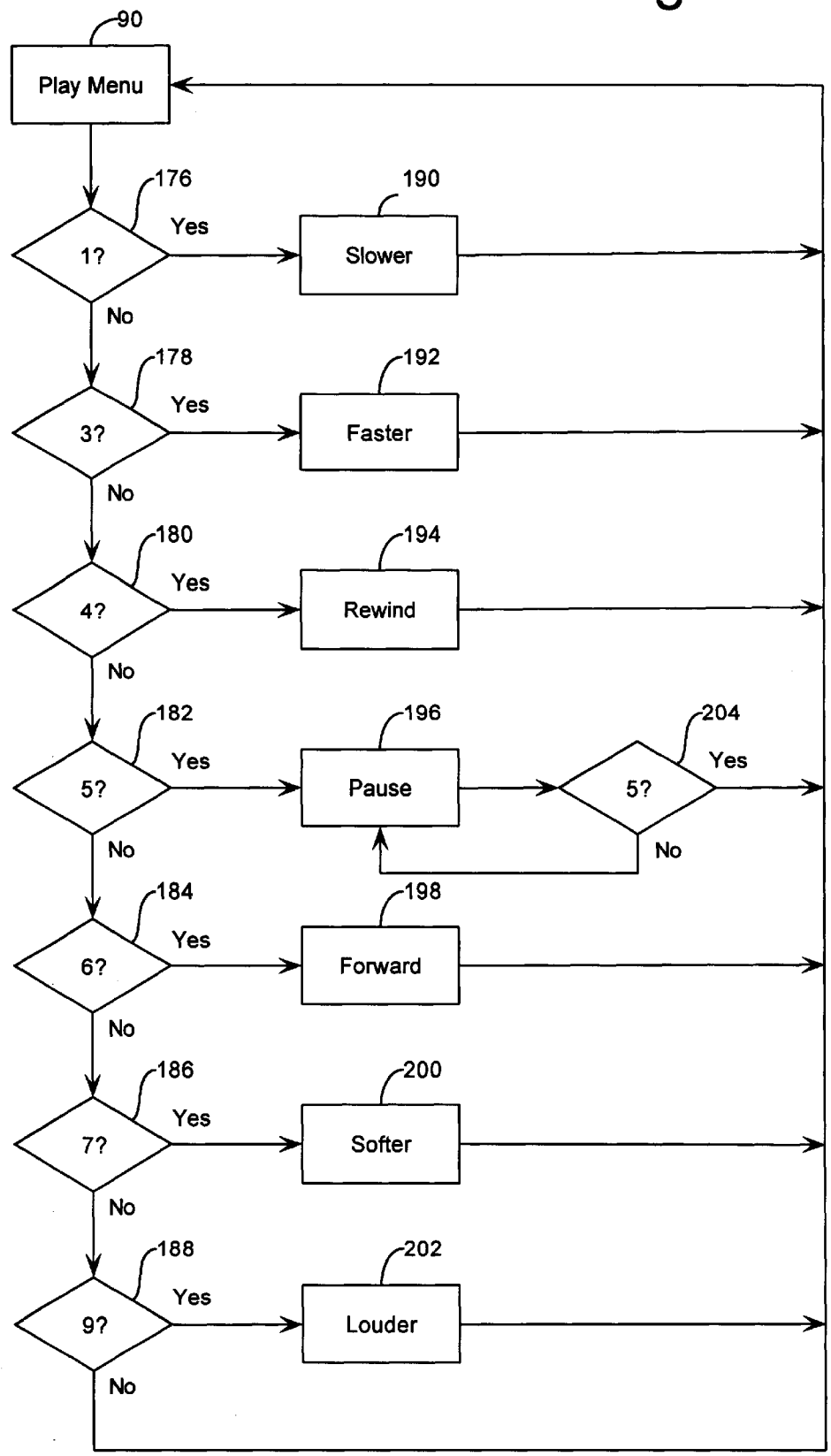
FIG. 11 functionally depicts the data playback controls of the autointeraction communication system.

Therefore, the IC 14 is provided with a variety of options which may be selected at any time during the presentation of the information. An example of some of these options and their implementation is depicted in FIG. 11. Block 90 in FIG. 11 plays the patient demographic information as described above. It will be appreciated that this is for the purpose of example only, and that block 90 in FIG. 11 may also represent block 100 from FIG. 10, in which the patient clinical information is presented. Similarly, the method as described below may be applied to any of the menus described herein in which information is presented.

The AICS 10 detects the selection of any one of several different keystrokes as entered from the keypad of a telephone. For example, the IC 14 may press "1" during the presentation of the demographic information. Thus, block 176 causes the presentation of the information to be slowed according to the instruction contained within block 190, and the presentation of the information continues as in block 90. Similarly, the IC 14 may select in block 178 for the presentation of the information to be made at a faster rate in block 192. In block 180 the selection may be made for the presentation of the information to skip backwards by a given amount of time, say four seconds, so that the IC 14 may quickly hear again a piece of the information without waiting for the presentation to continue to its completion and then restart.

In block 182 the IC 14 may select the presentation of the information to pause. The AICS 10 may, in block 204, either wait a predetermined amount of time before continuing the presentation of the information, or may wait for the same or some other key to be pressed before continuing the presentation of the information. Block 184 presents the IC 14 with the option to select to skip forwards in the presentation of the information by a given amount of time, such as four seconds. This may be useful when the IC 14 is trying to get to a point in the information that was previously presented, and is needed again. Blocks 186 and 188 provide the IC 14 with the options to selectively make the presentation of the information softer or louder, as in blocks 200 and 202, respectively.

In the example depicted, certain numeric keys have been associated with the options provided. Of course, other keys and combinations of keys could be assigned to these and other functions. In the example depicted, the number "2" could be used to move from the demographic information menu to the clinical information menu, the number "8" could be used to return to the main menu, and the number "0" could be used to transfer the call to the HSP 12 as in block 98 (all as depicted in FIG. 10).

Figure 12:
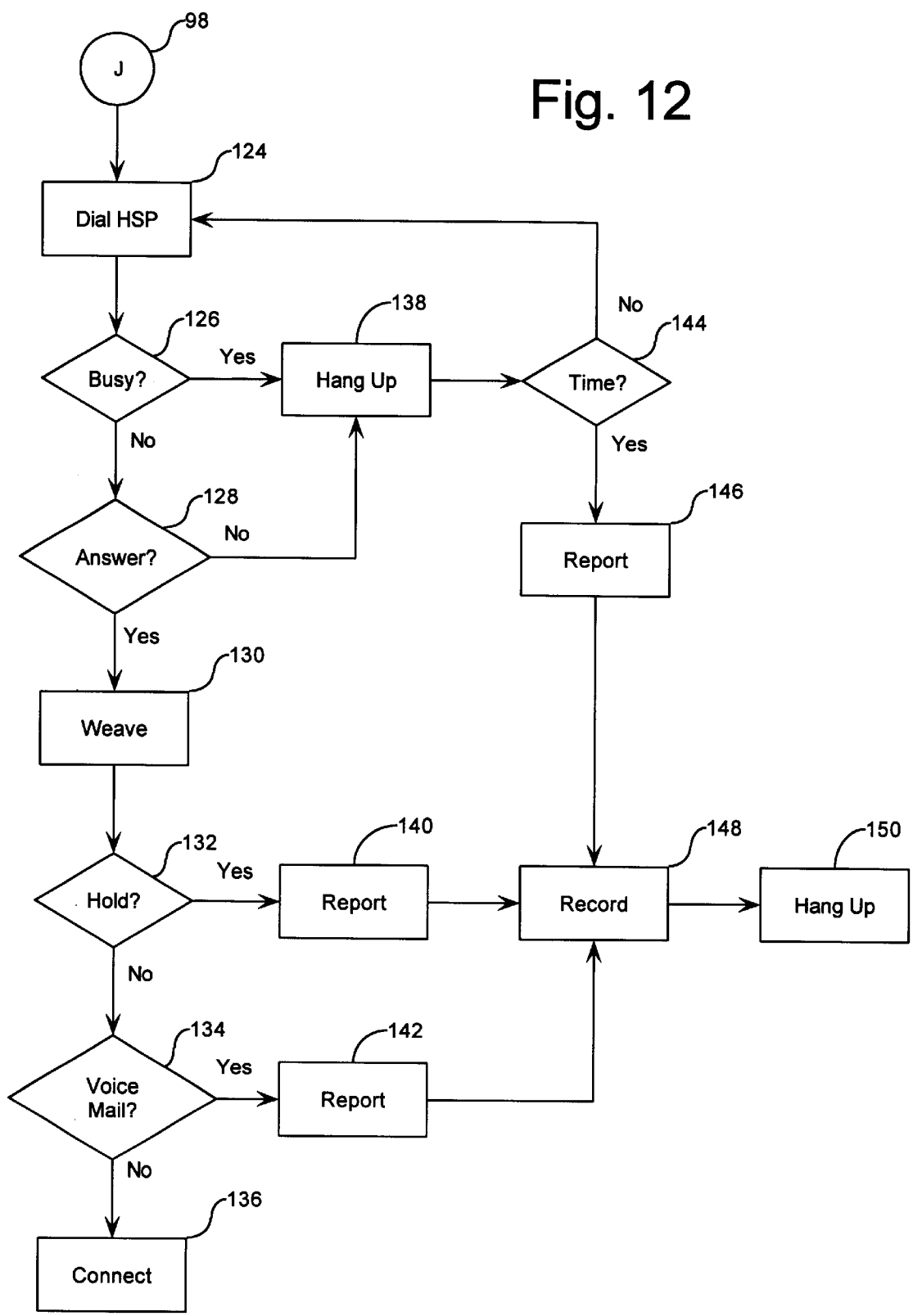
FIG. 12 functionally depicts the attended responder of the autointeraction communication system.

The transfer block 98 of FIG. 10 is again depicted in FIG. 12. This block 98 enters the routine whereby the IC 14 is able to directly contact the HSP 12 in an attended fashion. The IC 14 would select to do this when, for example, either the demographic information or the clinical information given by the HSP 12 for the patient was insufficient for the IC 14 to issue an authorization number, or because of some other defect in the information. The AICS 10 dials the originating HSP 12 in block 124, using the information provided by the HSP 12 at the beginning of the process, as described above. The AICS 10 may detect whether the HSP's 12 telephone line is either busy, as in block 126, or not being answered, as in block 128.

If the HSP's 12 telephone is either busy or not being answered, the AICS 10 disconnects the call as in block 138, and determines in block 144 whether another call to the HSP 12 should be attempted. As previously described, this determination can be based on criteria such as a maximum number of attempts or a maximum time during which attempts to connect to the HSP 12 are made. In alternate embodiments, no repeated attempts are made to connect to the HSP 12, or an infinite number of repeated attempts are made. If the maximum attempt threshold is not exceeded, then the determination is made by the AICS 10 to make another attempt to contact the HSP 12, then the HSP 12 is again dialed in block 124, and control continues as previously described.

If the telephone line for the HSP 12 is not busy and is answered, then a weave file for the HSP 12 is optionally employed to navigate the telephone menu structure, if any, for the HSP 12, in a manner similar to that described above at length for the IC 14. The call is eventually put through to the extension of the HSP 12 employee that deposited the information with the AICS 10, which initiated the telephone call to the IC 14. If the call is placed on hold, as determined in block 132, then the IC 14 may not wish to remain on hold. The AICS 10 may employ a routine, such as described above, to determine whether the maximum length of time on hold has been exceeded. This maximum length of time may be extremely small, which is effectually no length of time at all, before proceeding to another step of the method.

If the call is not on hold, AICS 10 determines in block 134 whether the call has been answered by a voice mail system. This can be accomplished by the AICS 10 by employing a method, such as detecting a short period of speech, corresponding to a recorded announcement, followed by a period of silence, during which a message should be delivered. If the telephone is answered by an employee of the HSP 12, such as in block 136, then the IC 14 is connected to the HSP 12, and the two employees can discuss the information that is needed. The AICS 10 may detect that the call is answered by a person rather than by a voice mail system by the length of time during which speech is detected. As described above, the message from a voice mail system tends to be longer in duration than a simple greeting typically given by a person who answers the telephone. This difference in the duration of speech when the call is answered is detected by the AICS 10, which makes the appropriate control decisions as described above.

If the transfer call from the IC 14 to the HSP 12 is successfully connected to an employee of the HSP 12, then the call is recorded and stored by the AICS 10, so that it may be referenced in the future by the HSP 12. If, however, the transfer call between the IC 14 and HSP 12 is not successfully connected, such as if the call times out as in block 144, is placed on hold as in block 132, or is answered by voice mail as in block 134, then the IC 14 is given a report of the status of the call, as in blocks 146, 140, and 142. For example, the report given to the IC 14 in block 146 may inform the IC 14 that the line for the HSP 12 is either busy or is not being answered.

Similarly, the reports provided by the AICS 10 in blocks 140 and 142 may inform the IC 14 that the call has been placed on hold or has been answered by voice mail, respectively. In these two cases, the IC 14 may alternately be presented with the option to either remain on hold for an additional incremental amount of time, or to leave a voice mail. Alternately, the IC 14 proceeds from the report blocks 146, 140, and 142, and is given the option to record in block 148 a message that will be delivered to the HSP 12, at such a time when the HSP 12 is available. The message from the IC 14 may be very detailed, or quite brief, depending on the additional information required by the IC 14. After the message from the IC 14 is recorded in block 148, the call is disconnected as in block 150.

The AICS 10 may make repeated attempts thereafter, using methods as described above, to contact the HSP 12 with the message recorded by the IC 14, or may make the determination to eventually leave the message on the employee's voice mail. Preferably, if the employee's voice mail is reached, the AICS 10 leaves a message that the IC 14 attempted to contact the HSP 12. This message is preferably left by the AICS 10 regardless of whether other additional options are taken by the AICS 10 or the IC 14.

Figure 13:
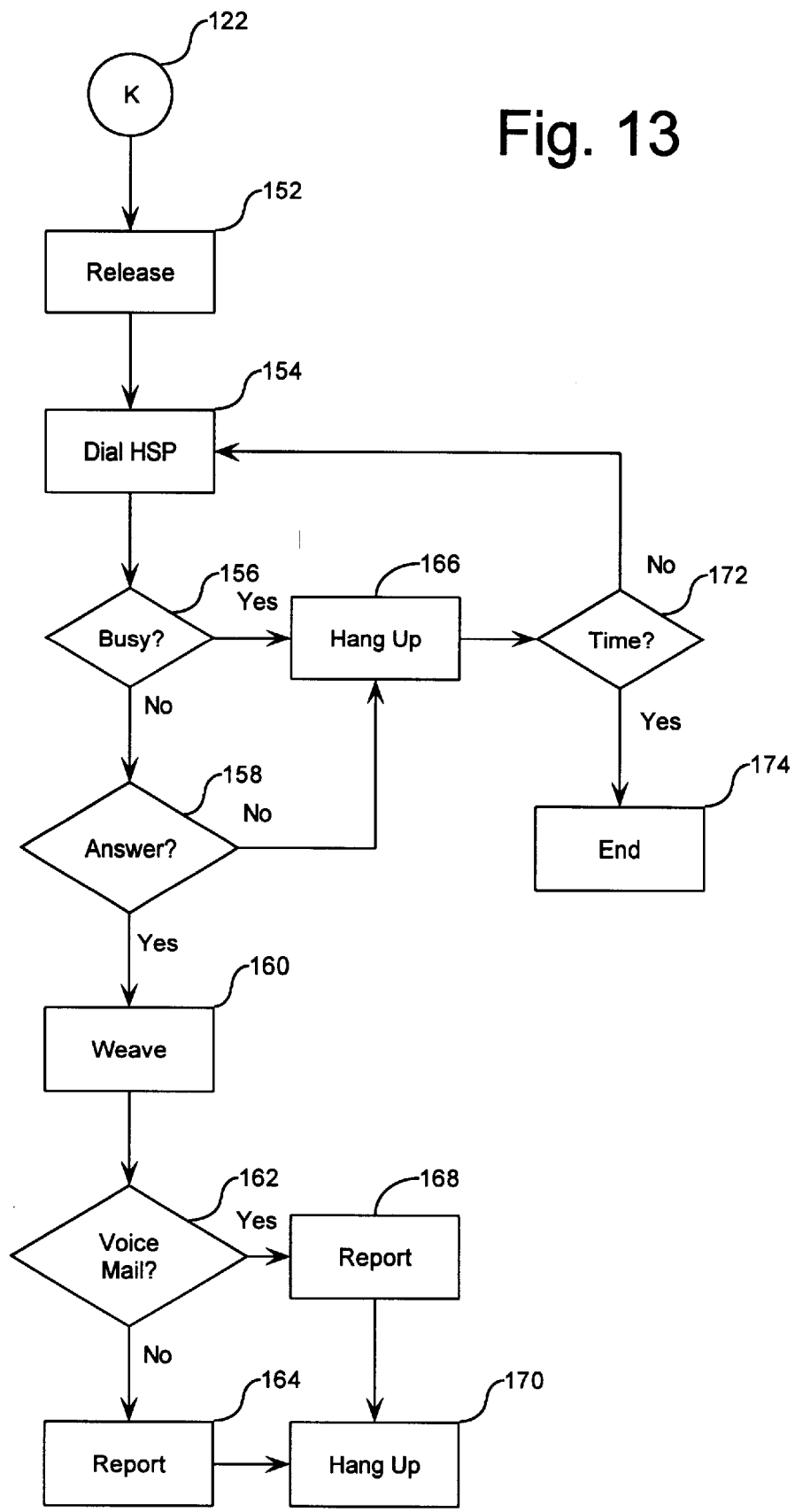
FIG. 13 functionally depicts the unattended responder of the autointeraction communication system.

Upon acceptance by the IC 14 of the recorded precertification authorization number in block 114, as depicted in FIG. 10, the AICS 10 proceeds to deliver the authorization to the HSP 12 as in block 122, which is continued in FIG. 13. In block 152 the AICS 10 informs the IC 14 that the information, such as the authorization number, has been recorded and accepted, and that the IC 14 need no longer remain on the telephone. Thus, the IC 14 is released by either hanging up or being disconnected by the AICS 10. Similar to that as described above, the AICS 10 next dials the HSP 12 in block 154. The call placed to the HSP 12 by the AICS 10 is processed in a manner very similar to that in which the transfer call from the IC 14 is processed, as described above in detail, and briefly rehearsed below.

The AICS 10 determines in block 156 if the line for the HSP 12 is busy, or in block 158 determines if the line for the HSP 12 is being answered. If the line is either busy or not answered, the call is disconnected in block 166, and the AICS 10 determines in block 172 if it should continue to attempt the call. If a maximum threshold has not been exceeded, then the HSP 12 is again dialed in block 154. If, however, a threshold has been exceeded, then the call is terminated in block 174. In this event, the HSP 12 may manually retrieve the authorization number or other information from the AICS 10, as all such information has been recorded and archived.

If the line for the HSP 12 is answered, the weave file is optionally employed in block 160 to navigate the telephone menu structure for the HSP 12 to the appropriate extension. The AICS 10 detects voice mail in block 162, according to the methods described above. The AICS 10 either delivers the message to the employee in block 164, or delivers the message to voice mail in block 168. The message delivered to voice mail may be a simple message from the AICS 10 that the desired message from the IC 14 has been received and may be retrieved from the AICS 10, or the message may be the exact message recorded by the IC 14. After the report is given in either of blocks 164 or 168, the AICS 10 disconnects the call as in block 170.

What has been described then is an apparatus and method for automated, interactive communication between parties, in which one party provides information to a system, the system contacts a second party, provides the information to the second party, receives responding information from the second party, and provides the responding information to the first party. All of the information so provided to the system is recorded, stored, archived, and indexed in such a fashion that it can later be recalled by the parties. It will be appreciated that the number of parties given in the description above is an example only. The system could be used to contact several different parties in either a serial or parallel manner, providing information to, and receiving information from some or all of the parties. Upon receipt of the information from the parties, the system could then return the gathered information to the originating party, all parties contacted, one or more third parties, or all or any combination of the above.

It will be appreciated that the invention as described above comprehends adaptation, rearrangement, and substitution of parts, all of which are within the scope and spirit of the invention as described above, and that the scope of the invention is only to be restricted by the language of the claims given below.

What is claimed is:

1. A communication system for providing voice message communication via a telephone system between a first party health care provider and a second party health care authorizer, comprising:

a first party message input for receiving first party voice messages, including a health care authorization request, from the first party across the telephone system, first party message playback for selectively presenting to the first party the first party voice messages across the telephone system, a message input structure for selectively parsing the first party voice messages received by the first party message input into different, associated memory locations, a message output structure for selectively providing the first party voice messages in the different, associated memory locations to a first party message output, the first party message output for delivery to the second party in an unattended manner the first party voice messages across the telephone system, a second party redialer for selectively causing the first party message output to repeatedly attempt to deliver the first party voice messages across the telephone system to the second party until the first party voice messages are successfully delivered across the telephone system, a second party weave file for navigating telephone menu structures associated with the second party, a second party message input for receiving across the telephone system second party voice messages, including a health care authorization code, from the second party in response to the first party voice messages, a second party message playback for selectively presenting to the second party the second party voice message across the telephone system, a second party message output for delivering to the first party in an unattended manner the second party voice message across the telephone system, a first party redialer for selectively causing the second party message output to repeatedly attempt to deliver the second party voice messages across the telephone system to the first party until the second party voice message are successfully delivered, a first party weave file for navigating telephone menu structures associated with the first party, a pass-through message channel for receiving across the telephone system and delivering across the telephone system in an attended manner pass-through voice messages between the second party and the first party, a memory for recording, storing, and indexing the first party voice messages, the second party voice messages, and the pass-through voice messages, and a first party voice message detector for determining when the second party voice messages and the pass-through voice message from the second party are received across the telephone system by the first party.

2. A method of communicating voice message information associated with a patient via a telephone system between a first party health care provider and a second party health care authorizer, comprising the steps of:

a. receiving a first party voice message from the first party, the first party message having;
  information associated with the first party, including;
    a call-back telephone number, and
    a first party identification,
  information associated with the second party, including;
    a delivery telephone number, and
    a weave file designation,
  information associated with a patient, including;
    a social security number,
    a name,
    demographic information, and
    clinical information, b. storing the first party message received from the first party in a memory location associated with the social security number associated with the patient, c. contacting the second party by negotiating a telephone system menu associated with the second party with a wave file associated with the second party, d. presenting the first party voice message to the second party, e. receiving input from the second party, f. selectively presenting the call-back telephone number associated with the first party to the second party in response to the input received from the second party, g. selectively presenting the first party identification to the second party in response to the input received from the second party, h. selectively presenting the social security number associated with the patient to the second party in response to the input received from the second party, i. selectively presenting the name associated with the patient to the second party in response to the input received from the second party, j. selectively presenting the demographic information associated with the patient to the second party in response to the input received from the second party, and k. selectively presenting the clinical information associated with the patient to the second party in response to the input received from the second party, l. selectively receiving from the second party a second party voice message in response to the input received from the second party, m. contacting the first party by negotiating a telephone system menu associated with the first party with a weave file associated with the first party, n. receiving input from the first party, and o. selectively presenting the second party voice message to the first party in response to the input received from the first party.

3. A storage device readable by a machine, tangibly embodying instructions executable by the machine to perform method steps to enable a first party to request a health care authorization from a second party and for the second party to provide the health care authorization to the first party, the method steps comprising:

receiving a first telephone call from the first party, receiving a first party voice message from the first party, the first party voice message having;
  information associated with the first party, including;
    a call-back telephone number, and
    a first party identification,
  information associated with the second party, including;
    a delivery telephone number, and
    a first weave file designation,
  information associated with a patient, including;
    a social security number,
    a name,
    demographic information, and
    clinical information, storing the first party voice message received from the first party in a memory location associated with the social security number associated with the patient, placing a second telephone call to the second party at the delivery telephone number, negotiating a telephone system menu associated with the second party with the first weave file designated and associated with the second party, waiting until the second party answers the second telephone call, providing to the second party a menu of options for delivering the first party voice message, receiving input from the second party in response to the menu of options, selectively presenting the call-back telephone number associated with the first party to the second party in response to the input received from the second party, selectively presenting the first party identification to the second party in response to the input received from the second party, selectively presenting the social security number associated with the patient to the second party in response to the input received from the second party, selectively presenting the name associated with the patient to the second party in response to the input received from the second party, selectively presenting the demographic information associated with the patient to the second party in response to the input received from the second party, selectively presenting the clinical information associated with the patient to the second party in response to the input received from the second party, selectively placing a third telephone call from the second party to the first party in response to input received from the second party, when the second party desires to speak directly with the first party, selectively receiving from the second party a second party voice message in response to input received from the second party, the voice message including the health care authorization, placing a fourth telephone call to the first party at the call-back telephone number, negotiating a telephone system menu associated with the first party using a second weave file, waiting until the first party answers the fourth telephone call, providing to the first party a menu of options for delivering the second party voice message, receiving input from the first party in response to the menu of options, and selectively presenting the second party voice message, including the health care authorization, to the first party in response to the input received from the first party.

* * * * *

UNITED STATES PATENT AND TRADEMARK OFFICE
CERTIFICATE OF CORRECTION

PATENT NO. : 6,263,052 B1   Page 1 of 1
DATED : July 17, 2001
INVENTOR(S) : Guille B. Cruze It is certified that error appears in the above-identified patent and that said Letters Patent is hereby corrected as shown below:

Column 7,
Line 7, delete "4" and insert -- 14 --.

Signed and Sealed this

Sixteenth Day of April, 2002

Attest:

JAMES E. ROGAN
Attesting Officer   Director of the United States Patent and Trademark Office